(12) United States Patent
Dorman et al.

(10) Patent No.: US 11,512,733 B2
(45) Date of Patent: *Nov. 29, 2022

(54) COMPOSITE VEHICLE DRIVESHAFT ASSEMBLY WITH BONDED END YOKE AND METHOD FOR PRODUCING SAME

(71) Applicant: Composite Drivelines, LLC, West Allis, WI (US)

(72) Inventors: James Lee Dorman, West Allis, WI (US); Daniel P. Lentsch, Milwaukee, WI (US); Gregg Piper, Wauwatosa, WI (US)

(73) Assignee: Composite Drivelines, LLC, West Allis, WI (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/070,480

(22) Filed: Oct. 14, 2020

(65) Prior Publication Data

US 2021/0108674 A1 Apr. 15, 2021

Related U.S. Application Data

(60) Provisional application No. 62/915,370, filed on Oct. 15, 2019, provisional application No. 62/915,427, filed on Oct. 15, 2019.

(51) Int. Cl.
*F16C 3/02* (2006.01)
*F16D 3/40* (2006.01)
(Continued)

(52) U.S. Cl.
CPC ............ *F16C 3/023* (2013.01); *B29C 65/542* (2013.01); *B29C 66/721* (2013.01); *F16C 3/026* (2013.01);
(Continued)

(58) Field of Classification Search
CPC ...... F16C 3/023; F16C 3/026; F16C 2208/02; F16C 2208/04; F16C 2226/40;
(Continued)

(56) References Cited

U.S. PATENT DOCUMENTS 2,380,952 A 6/1943 Dewey
4,421,497 A 12/1983 Federmann et al.
(Continued)

FOREIGN PATENT DOCUMENTS

DE 102011109130 2/2013
EP 1753962 2/2007
(Continued)

OTHER PUBLICATIONS

U.S. Appl. No. 17/070,525, filed Oct. 14, 2020.
U.S. Appl. No. 17/070,542, filed Oct. 14, 2020.

*Primary Examiner* — Greg Binda
(74) *Attorney, Agent, or Firm* — Boyle Fredrickson S.C.

(57) ABSTRACT

A composite vehicle driveshaft assembly includes a composite tube and a yoke bonded to one of the ends of the tube. The yoke has an inner sleeve that is concentrically received in the end of the tube. The sleeve has an outer peripheral surface that faces the inner peripheral surface of the tube with a cavity formed therebetween. An adhesive injection passage is formed in the yoke and extends at an acute angle from an inlet that is formed in an axial surface of the yoke to an outlet that is formed in the outer peripheral surface of the sleeve and that opens into the cavity. Also disclosed is a method of bonding a yoke of such a driveshaft assembly to a composite tube.

15 Claims, 11 Drawing Sheets

(51) Int. Cl.
*B29C 65/54* (2006.01)
*B29C 65/00* (2006.01)

(52) U.S. Cl.
CPC ............ *F16D 3/40* (2013.01); *F16C 2208/02* (2013.01); *F16C 2208/04* (2013.01); *F16C 2226/40* (2013.01); *F16C 2326/06* (2013.01); *Y10T 403/473* (2015.01)

(58) Field of Classification Search
CPC . F16C 2326/06; B29C 65/542; B29C 66/721; F16D 3/40; Y10T 403/473
USPC ........................................ 464/134, 181, 182
See application file for complete search history.

(56) References Cited

U.S. PATENT DOCUMENTS

| | | | |
|---|---|---|---|
| 4,663,819 A | 5/1987 | Traylor | |
| 4,664,644 A | 5/1987 | Kumata et al. | |
| 4,722,717 A | 2/1988 | Salzman et al. | |
| 4,930,204 A | 6/1990 | Schurter | |
| 4,932,924 A | 6/1990 | Löbel | |
| 5,087,147 A | 2/1992 | Petrzelka et al. | |
| 5,118,214 A | 6/1992 | Petrzelka et al. | |
| 5,309,620 A | 5/1994 | Shimohara et al. | |
| 5,320,579 A | 6/1994 | Hoffmann | |
| 5,421,781 A | 6/1995 | Mackellar | |
| 5,601,493 A | 2/1997 | Nakazono et al. | |
| 5,601,494 A | 2/1997 | Duggan | |
| 5,632,685 A | 5/1997 | Myers | |
| 5,868,517 A | 2/1999 | Aoki et al. | |
| 6,193,612 B1 | 2/2001 | Craig et al. | |
| 6,234,907 B1 | 5/2001 | Moser | |
| 6,682,436 B2 | 1/2004 | Kimoto et al. | |
| 6,692,365 B2 | 2/2004 | Suzuki et al. | |
| 7,062,835 B2 | 6/2006 | Sugiyama et al. | |
| 7,288,029 B1 | 10/2007 | Lyon et al. | |
| 7,347,785 B2 | 3/2008 | Worman, Jr. et al. | |
| 7,367,740 B2 | 5/2008 | Lazic et al. | |
| 7,442,127 B2 | 10/2008 | Kai et al. | |
| 7,485,045 B2 | 2/2009 | Williams | |
| 7,488,257 B1 | 2/2009 | Booker et al. | |
| 7,946,924 B2 | 5/2011 | Neugebauer et al. | |
| 8,298,633 B1 | 10/2012 | Chen | |
| 8,313,067 B2 | 11/2012 | Knieriem et al. | |
| 8,597,131 B2 | 12/2013 | Pisinger | |
| 8,715,093 B2 | 5/2014 | O'Neil et al. | |
| 2001/0013538 A1 | 8/2001 | Drummond et al. | |
| 2005/0277480 A1 | 12/2005 | Breese | |
| 2007/0262066 A1 | 11/2007 | Douglass et al. | |
| 2013/0294824 A1 | 11/2013 | Pisinger | |
| 2014/0221110 A1 | 8/2014 | Shippy et al. | |
| 2015/0345540 A1 | 12/2015 | Kim | |
| 2016/0123378 A1 | 5/2016 | Mintzlaff et al. | |
| 2017/0051791 A1 | 2/2017 | Leko et al. | |
| 2019/0185048 A1 | 6/2019 | Carlini | |
| 2019/0301519 A1 | 10/2019 | Dorman et al. | |
| 2019/0301520 A1 | 10/2019 | Dorman et al. | |
| 2021/0108675 A1* | 4/2021 | Dorman | ................ F16C 3/026 |

FOREIGN PATENT DOCUMENTS

| | | | |
|---|---|---|---|
| GB | 1018530 | | 1/1966 |
| GB | 1 585 163 | * | 2/1981 |
| JP | 6091008 | | 5/1985 |
| JP | 05215119 | | 8/1993 |
| JP | 06-010940 | | 1/1994 |
| JP | 2017095035 | | 6/2017 |
| KR | 20100107719 | | 10/2010 |
| KR | 10-1881928 | | 7/2018 |
| WO | 9605101 | | 2/1996 |

* cited by examiner

COMPOSITE VEHICLE DRIVESHAFT ASSEMBLY WITH BONDED END YOKE AND METHOD FOR PRODUCING SAME

CROSS-REFERENCE TO RELATED APPLICATIONS

The present application claims priority on U.S. Provisional Patent Application Ser. Nos. 62/915,370, filed Oct. 15, 2019 and entitled COMPOSITE VEHICLE DRIVESHAFT ASSEMBLY WITH BONDED END YOKE, and 62/915,427, filed Oct. 15, 2019 and entitled COMPOSITE VEHICLE DRIVESHAFT ASSEMBLY, the entirety of each of which is hereby incorporated herein by reference.

FIELD OF THE INVENTION

The invention relates generally to vehicle propel shafts or driveshafts that include one or more tubular sections made in part from composite materials. The invention additionally relates to a composite vehicle driveshaft assembly with a yoke bonded to an end of a composite tube and to a process of producing such a driveshaft and to a method of producing such a driveshaft assembly.

BACKGROUND OF THE INVENTION

Composite driveshaft assemblies are available, which have resulted from efforts to provide weight reduction for rotating assemblies. Such driveshaft assemblies have a long tubular section that is formed from resin-bound spiral wound filaments and end couplers or joints in the form of metallic driveline components such yokes, flex joints etch. However, composite driveshaft assemblies have not been widely implemented for vehicle use. Designing composite driveshaft assemblies with composite tubes that connect to metallic components such as conventional vehicle driveline components presents numerous challenges.

For example, the composite tubes operate in substantially different use environments than other driveshaft applications. Vehicle driveshafts operate in heat envelopes that expose them to high operating temperatures and large temperature variations, operate at high rotational speeds and with large rotational speed variations, and experience substantial torsional loading conditions such as shock-loads and/or other extreme torque spikes, and are subject to stricter diameter and other size constraints.

Connecting the composite tubes to other driveline components such as yokes presents an especially difficult challenge. It is difficult to design and assemble joints, fittings, or adapters to transition from the composite tubes to yokes or other end couplers that can maintain connection integrity with the composite tubes while handling these operating conditions and that are also sufficiently manufacturable and economical. Since composite tubes cannot be welded, they must be bonded to the end coupler. One approach is to bond the inner surface of the end of the composite tube to an outer surface of the end coupler. Bores must be provided in the tube and/or the end coupler to permit injection of an adhesive therebetween. However, drilling radial holes in the tube weakens the tube. The holes may also be prone to plugging with loose filaments, hindering or preventing the injection of adhesives.

The need therefore has arisen to provide a composite driveshaft assembly having a composite tube that is securely and reliably bonded to an end yoke without unacceptably weakening the composite tube or the end yoke.

The need additionally has arisen to provide a method of bonding composite tube bonded to an end to form a composite driveshaft assembly.

SUMMARY OF THE INVENTION

In accordance with a first aspect of the invention, a composite vehicle driveshaft assembly includes a composite tube with a tube sidewall that extends longitudinally between input and output ends of the tube. A yoke is bonded to one of the ends of the tube. The yoke has an inner sleeve that is concentrically received in the associated end of the tube. The sleeve has an outer peripheral surface that faces the inner peripheral surface of the tube with a cavity formed therebetween. An adhesive injection passage is formed in the yoke and extends at an acute angle from an inlet formed in an axial surface of the yoke to an outlet formed in the outer peripheral surface of the sleeve. The angle of the injection passage is selected to connect to the cavity without removing materials in amounts and at locations that unacceptably weaken the yoke. Because the outlet intersects the surface of the sleeve at an acute angle rather than perpendicularly, the outlet is elliptical in shape, providing a relatively large opening through which adhesive can flow into the cavity.

In accordance with another aspect of the invention, a method of bonding a yoke of a driveshaft assembly to a composite tube of the driveshaft assembly includes injecting an adhesive at an acute angle from an axial surface of the yoke, through an opening in an outer peripheral surface of a sleeve of the yoke, and into a cavity formed between the outer peripheral surface of the sleeve of the yoke and an inner peripheral surface of the composite tube. The adhesive then cures.

In accordance with another aspect invention, a method is provided of making a composite vehicle driveshaft assembly. The method may include performing various preliminary steps before inserting the sleeve into the composite tube and bonding the sleeve to the composite tube. The preliminary steps may include preparing the composite tube and preparing the sleeve. Tube preparation may include cleaning an inner circumferential surface of an end of the composite tube and cutting the end of the composite tube to provide the desired length. A flame treatment may be performed to the inner circumferential surface of the end of the composite tube to facilitate bonding. Sleeve preparation may include cleaning its outer circumferential surface.

These and other features and aspects of the present invention will be better appreciated and understood when considered in conjunction with the following description and the accompanying drawings. It should be understood, however, that the following description, while indicating preferred embodiments of the present invention, is given by way of illustration and not of limitation. Many changes and modifications may be made within the scope of the present invention without departing from the scope of the invention.

BRIEF DESCRIPTION OF THE DRAWINGS

Various exemplary embodiments of the subject matter disclosed herein are illustrated in the accompanying drawings in which like reference numerals represent like parts throughout, and in which.

Figure 1:
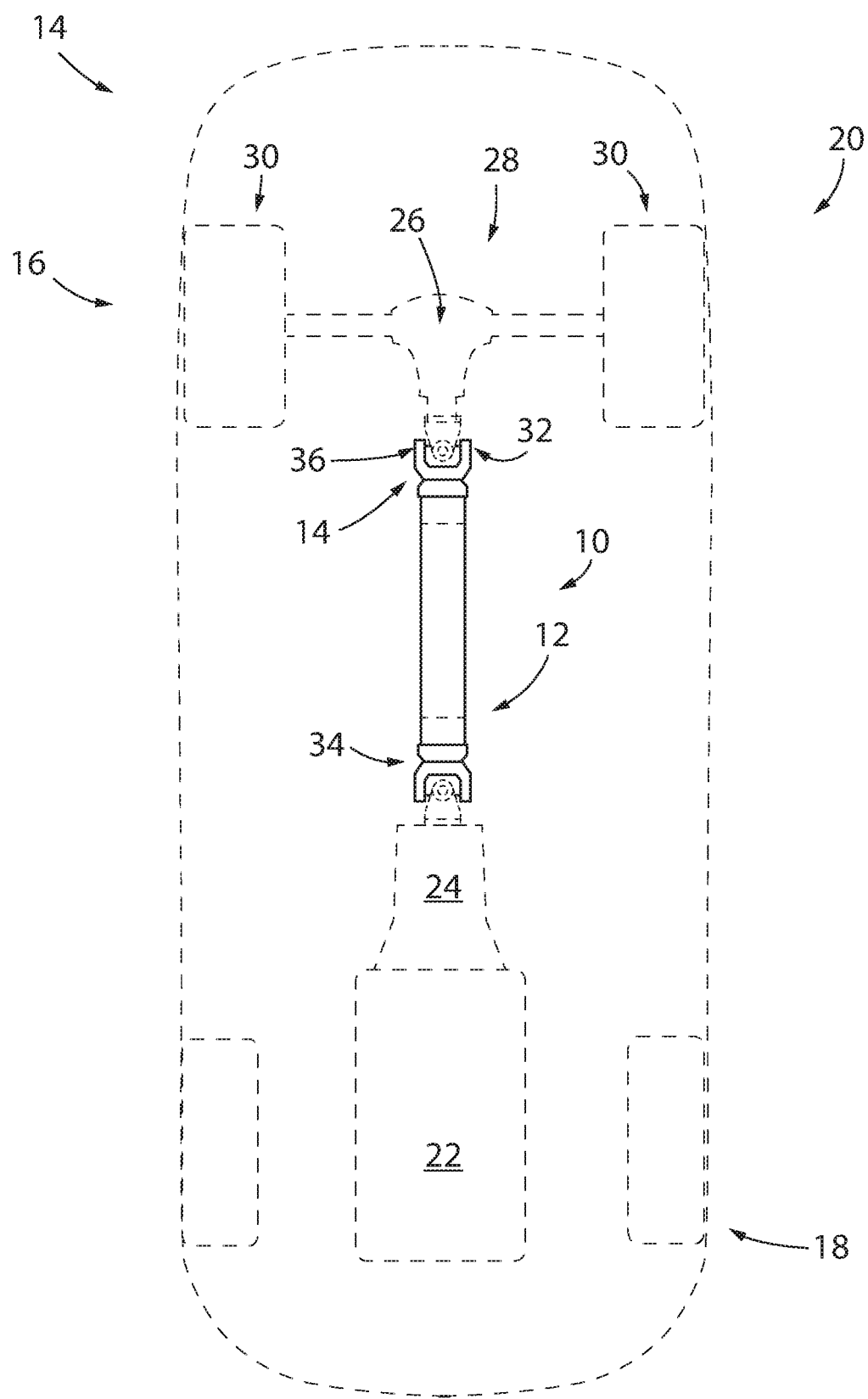
FIG. 1 schematically illustrates a vehicle with a composite vehicle driveshaft assembly constructed in accordance the invention.

Before the embodiments of the invention are explained in detail, it is to be understood that the invention is not limited in its application to the details of construction and the arrangement of the components set forth in the following description or illustrated in the drawings. The invention is capable of other embodiments and of being practiced or carried out in various ways. Also, it is to be understood that the phraseology and terminology used herein are for the purpose of description and should not be regarded as limiting. The use of "including" and "comprising" and variations thereof is meant to encompass the items listed thereafter and equivalents thereof as well as additional items and equivalents thereof.

DETAILED DESCRIPTION OF THE PREFERRED EMBODIMENTS

Referring now to the drawings and initially to FIG. 1, a composite vehicle driveshaft assembly 10 is illustrated as installed in a vehicle, which vehicle is represented here as an automobile 16. Automobile 16 has front and rear ends 18, 20 and a powertrain that includes a prime mover such as an engine 22. A transmission 24 receives power from the engine 22 and delivers it downstream through the composite vehicle driveshaft 10 to a differential 26 that delivers the power through a drive axle 28 to a pair of drive wheels 30. The illustrated driveshaft assembly 10 has a composite tube 40 and end components or couplers 12 and 14 respectively connecting the driveshaft front end 34 to the transmission 24 and the driveshaft rear end 36 to the differential 26. It is understood that instead of the transmission 24 and differential 26, the composite vehicle driveshaft assembly 10 may instead transmit power from the engine 22 to a transaxle that combines a transmission and drive axle.

Figure 2:
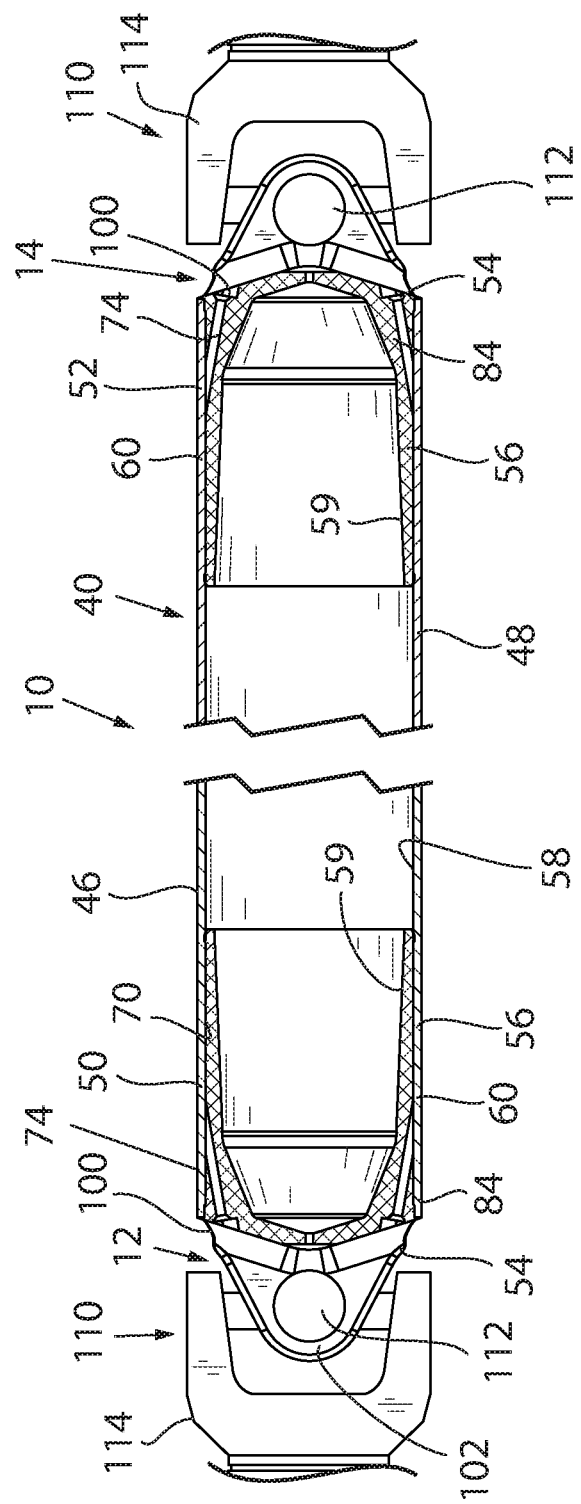
FIG. 2 is a sectional elevation view of the driveshaft assembly of FIG. 1.
Figure 3:
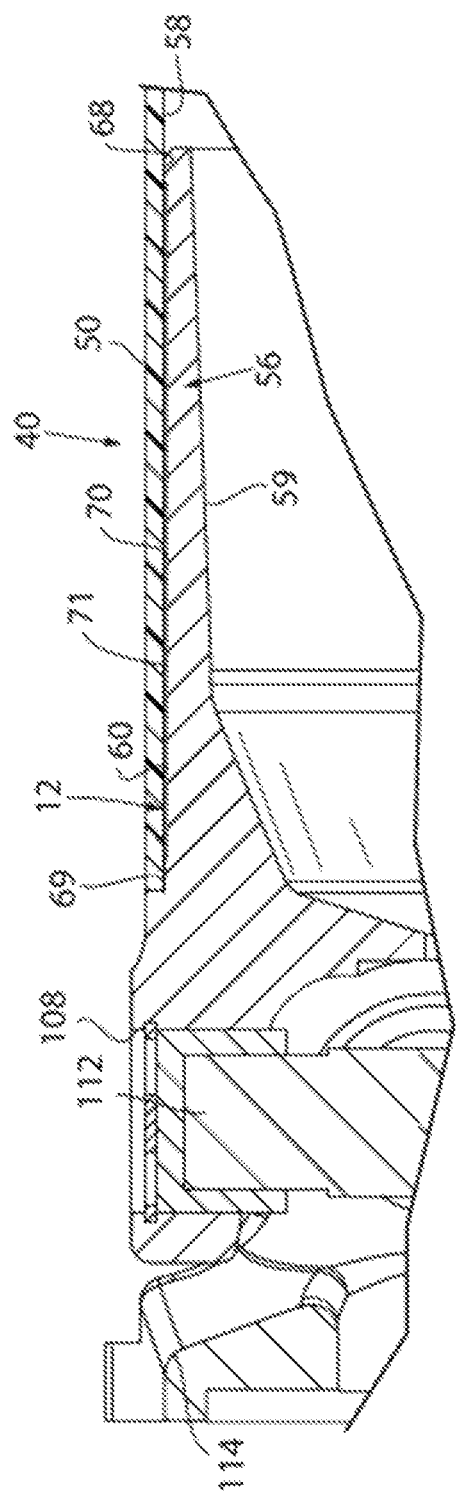
FIG. 3 is a fragmentary sectional view of a portion of the driveshaft assembly of FIG. 1, showing the connection of an end yoke of the driveshaft assembly to a composite tube.
Figure 4:
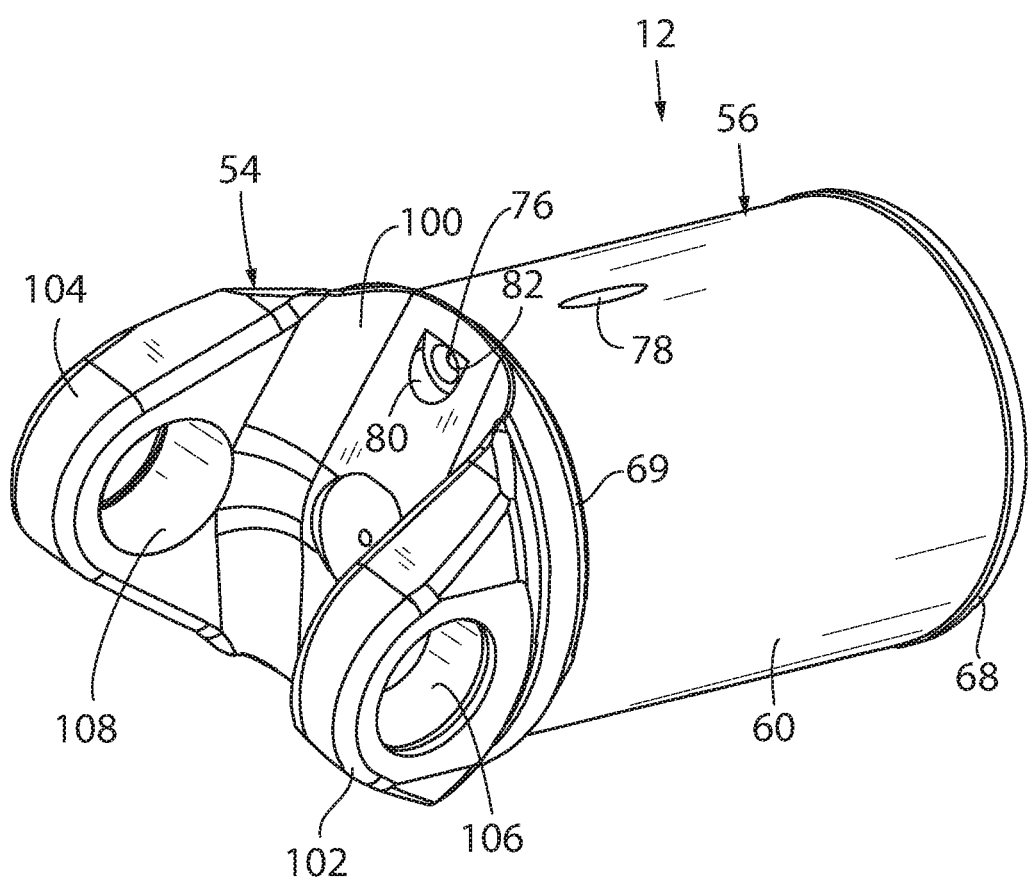
FIG. 4 is a perspective view of an end yoke of the composite driveshaft assembly of FIGS. 1-3.
Figure 5:
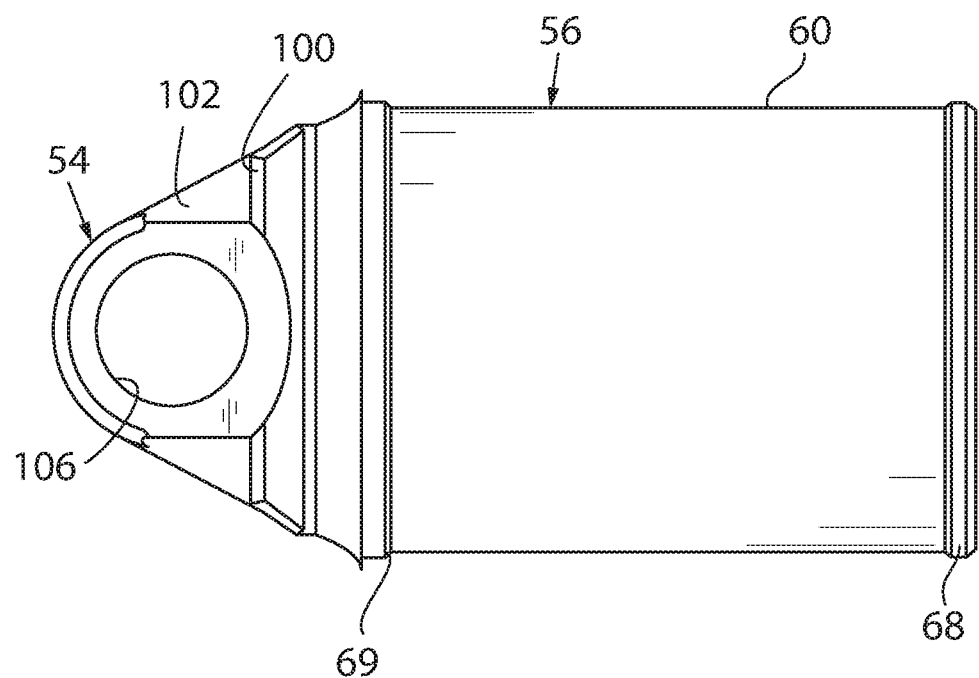
FIG. 5 is an elevation view of the end yoke of FIG. 4.

Referring now to FIGS. 2 and 3, composite vehicle driveshaft assembly 10 includes a composite tube 40 that defines an intermediate portion of the composite vehicle driveshaft assembly 10 and that is bonded to the couplers 12 and 14 at its front and back ends, respectively. Composite tube 40 may be a cylindrical hollow tube made from a composite material(s), including fibrous and resin materials components. Composite tube 40 has a body 46 with inner and outer peripheral surfaces 58 and 48 and a pair of ends, shown as front and rear tube ends 50, 52. The composite tube 40 may be a product of a filament winding process. The filament winding process may include wrapping or winding a filament(s) or string(s), for example, single fiber strings that are soaked in a resin around a steel or other sufficiently rigid core or mandrel. The fibers may include, for example, carbon fiber and/or fiberglass fibers. The fiber soaking may provide a wet laminate or the fiber(s) may be pre-soaked in a resin to provide what is sometimes referred to in the industry as "pre-prig materials". Regardless of the particular fiber soaking procedure, after the filament winding process, the wound filament(s) or wound tubular product is then oven-heat cured.

Tube lengths, diameters, and thicknesses may vary from application to application and with designer preference, with thinner tubes typically being used for shorter driveshafts and thicker tubes being used for longer driveshafts. Tube lengths of 10" to 70" (254 mm to 1780 mm) are typical for automotive driveshaft application. Tube inner diameters may vary from about 2.5" to 5" (65 mm to 125 mm). Tube thicknesses may vary from about 0.125" to 0.155" (31.75 mm to 39.37 mm), with thicker tubes being more typical for longer driveshafts. Tube diameter for automotive applications typically will be 2.5" (63.5 mm), 3" (76.2 mm), or 3.5" (88.9 mm), depending on the specific application.

Regardless of the particular configuration of composite tube 40, composite tube 40 has input and output ends, represented here as front and rear tube ends 50, 52 that are bonded to the end couplers 12, 14. The bonding may connect components made of dissimilar materials to each other. This allows a non-metallic component, such as the composite tube 40, to provide a substantial or a majority portion of the length of the composite vehicle driveshaft assembly 10 while also providing metallic component connections through the joints at the interfaces between the driveshaft assembly front and rear ends 34, 36 and the transmission 24 and differential 28.

Still referring to FIG. 2, at least one, and both in the illustrated example, of the end components or couplers 12 and 14 take the form of yokes bonded to the ends of the composite tube 40. Though two identical yokes are illustrated, it should be understood that one of the yokes could be replaced by a different yoke or by a different end component/coupler or end joints such as a flex coupler, CV (constant-velocity) coupler, a slip yoke or other splined coupler. The following description of yoke 12 therefore applies equally to yoke 14.

Referring to FIGS. 2-8 yoke 12 is connected to (and technically forms part of) a universal joint 110. Yoke 12 has an outer coupler 54 and an inner tubular sleeve 56 formed from a single metal casting, typically aluminum or steel. The outer coupler 54 has a crown 100 and first and second opposed arms 102 and 104 extending axially outwardly from the crown 100. The arms 102 and 104 have through-bores 106 and 108 for connection to a trunnion 112 of a universal joint 110 as shown. The trunnion 112 and corresponding bearings (not shown) connect the arms 102 and 104 of yoke 12 to an outer yoke 114 which, in turn, is coupled to another driveline component. Alternatively, the arms 102, 104 could be replaced by or supplemented with connectors for attachment to other driveline joints such as a flex joint or a constant velocity (CV) joint.

Referring to FIGS. 3-6, the sleeve 56 has inner and outer peripheral surfaces 59 and 60. The sleeve 56 fits concentrically in the front tube end 50 of tube 40 so that the inner peripheral surface 58 of the composite tube 40 faces toward an outer peripheral surface 60 of the sleeve 56, with the portion of the sleeve 56 that inserts into and is concentrically held in the tube 40 defining an inserted section. Sleeve 56 may be aluminum or made from a ferrous metal such as steel. As best seen in FIG. 3, a cavity 70 is formed concentrically between the inner surface 58 of the composite tube 40 and the outer surface 60 of the sleeve 56 for receiving adhesive. Cavity 70 is sealed at its axial ends by structures extending radially between the sleeve 56 and the composite tube 40. In the illustrated embodiment, these structures take the form of inner and outer lands 68 and 69 that extend radially outward from the outer circumferential surface 60 of the sleeve 56 to the inner peripheral surface of the composite tube 40, with the lands 68 and 69 being longitudinally spaced from each other along the sleeve 56. Accordingly, cavity 70 extends continuously or as an unsegmented space between the lands 68, 69 at its distal ends, concentrically between the sleeve 56 and composite tube 40, which provides a right circular hollow cylinder configuration of the cavity 70. Each of the respective outer and inner circumferential surfaces of the yoke 12 and tube 40 at the cavity 70 (e.g., between the lands 68, 69) defines a corresponding bond area. The lands 68 and 69 engage the inner peripheral surface 58 of the composite tube 40 through a snug fit, which may be an interference fit that requires press-assembly. For "3.5" (90 mm) bond yoke having a nominal composite tube inner diameter of 3.5" (90 mm) and a sleeve length of about 4.8" (122 mm), the sleeve 56 may have an outer diameter of 3.505" (89.7 mm) at the lands 68 and 60 and 3.46" (87.9 mm) between the lands. The cavity 70 may have a thickness of 0.045" (1.14 mm) and a length of about 4.4" (112 mm) Such a fit ensures concentricity of the sleeve 56 within the composite tube 40 by coaxially locating the sleeve 56 within the composite tube 40 in a manner that prevents radial offset or angular tilting of the sleeve 56 with respect to a longitudinal axis of the tube 40.

Still referring to FIG. 3, cavity 70 is filled with an adhesive 71 to bond the sleeve 56 to the composite tube 40. The adhesive may be any of a variety of industrial, aerospace, or other suitable adhesives, epoxies, or other bonding agents, such as a suitable methacrylate adhesive or various one available from 3M® under Scotch-Weld™ and various other tradenames. Adhesive injection, and other aspects of a possible bonding processes and its associated process, is discussed in more detail below in conjunction with FIGS. 9-11.

The bond between the sleeve 56 and the composite tube 40 may allow for suitable automotive applications and other high torque applications, including high performance vehicle applications that require driveshafts with high torque capacities. The bonding strength between the sleeve 56 and the composite tube 40 may provide torque capacities within a range of at least about 300 lb./ft of torque capacity up to about 80,000 to 100,000 lb./ft of torque capacity of the composite vehicle driveshaft assembly 10 without bond failure between the sleeve 56 and the composite tube 40.

Referring to FIGS. 2, 4, 6, and 7, at least one port, bore, or adhesive injection passage 74 is provided in the yoke 12 for the injection of the adhesive into the cavity 70 during an adhesive injection procedure. The adhesive injection passage 74 is shown here with an adhesive inlet 76 (FIG. 7) located axially beyond the end of the composite tube 40 and an adhesive outlet 78 opening into the cavity 70. For a sleeve having and outside diameter of 3.54" (90 mm), the passage may be between 0.078" (2 mm) and 0.276" (7 mm) in diameter and, more typically, is 0.157" (4 mm) in diameter. The passage 74 extends linearly at an acute angle relative to the axial centerline of the composite driveshaft assembly 10 from an inlet 76 formed in an axial end surface of the yoke 12 to an outlet 78 formed in the outer peripheral surface of the sleeve 56 within the cavity 70. The slope of the angle may vary from application to application. Ideally, it should be as shallow as practical so as to maximize the area of the elliptical outlet 78 without unacceptably weakening the yoke by removing too much material in aggregate or in the vicinity of a given surface or, in the alternative, having to undesirably add additional mass to the yoke to accommodate the shallow passage. Angles of 5 degrees to 20 degrees are typical, with angles of about 10-15 degrees being the most typical. The illustrated passage 74 extends at an angle of 10 degrees and is 1.18" (30 mm) long.

The location of the inlet 76 on the crown 100 of the yoke 12 negates the need to drill into the composite tube 40. Inlet 76 is located on the crown 100 about mid-way between the arms 102 and 104. The inlet 76 may be stepped or otherwise shaped to mate with an injection nozzle of a given size and shape to inhibit or prevent adhesive leakage past the perimeter of the fill nozzle. In the illustrated embodiment, the inlet 76 includes an outer cylindrical counterbore 80 and an inner frustoconical countersink 82 connecting the counterbore 80 to the interior of the passage 74.

As mentioned above, the outlet 78 of passage 74 is elliptical or ovoid rather than circular, despite the fact that the passage 74 is circular, due to the fact that the passage 74 intersects the outer peripheral surface 60 of the sleeve 56 at an acute angle rather than perpendicularly. The outlet 78 thus has a relatively large surface area and axial extent when compared to those of a circular outlet, facilitating the flooding of the cavity 70 when adhesive is injected through the passage 74 from the inlet 76. In the present example in which the passage has a diameter of 4 mm and extends at an angle of 10 degrees, the outlet 78 has an area of about 3.25 in.$^2$ (80 mm$^2$), significantly larger than the (0.50) in$^2$ (12.5 mm$^2$) opening that would be formed from a circular outlet.

Figure 6:
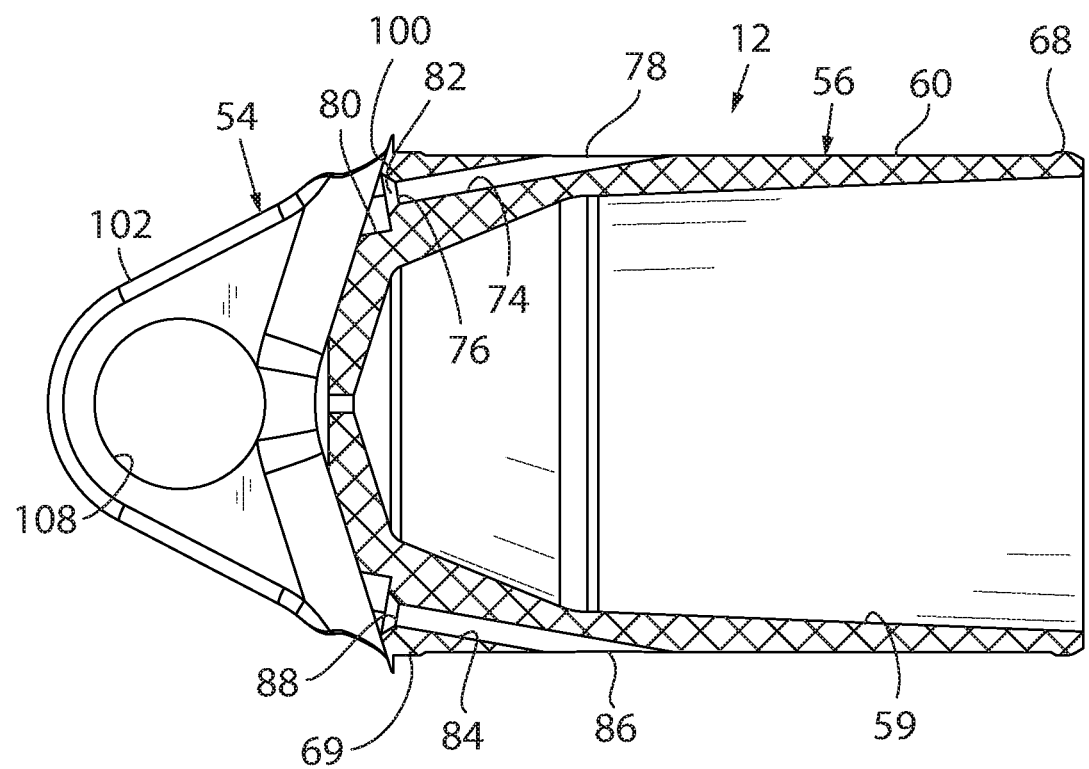
FIG. 6 is a sectional elevation view of the end yoke of FIGS. 4 and 5.
Figure 7:
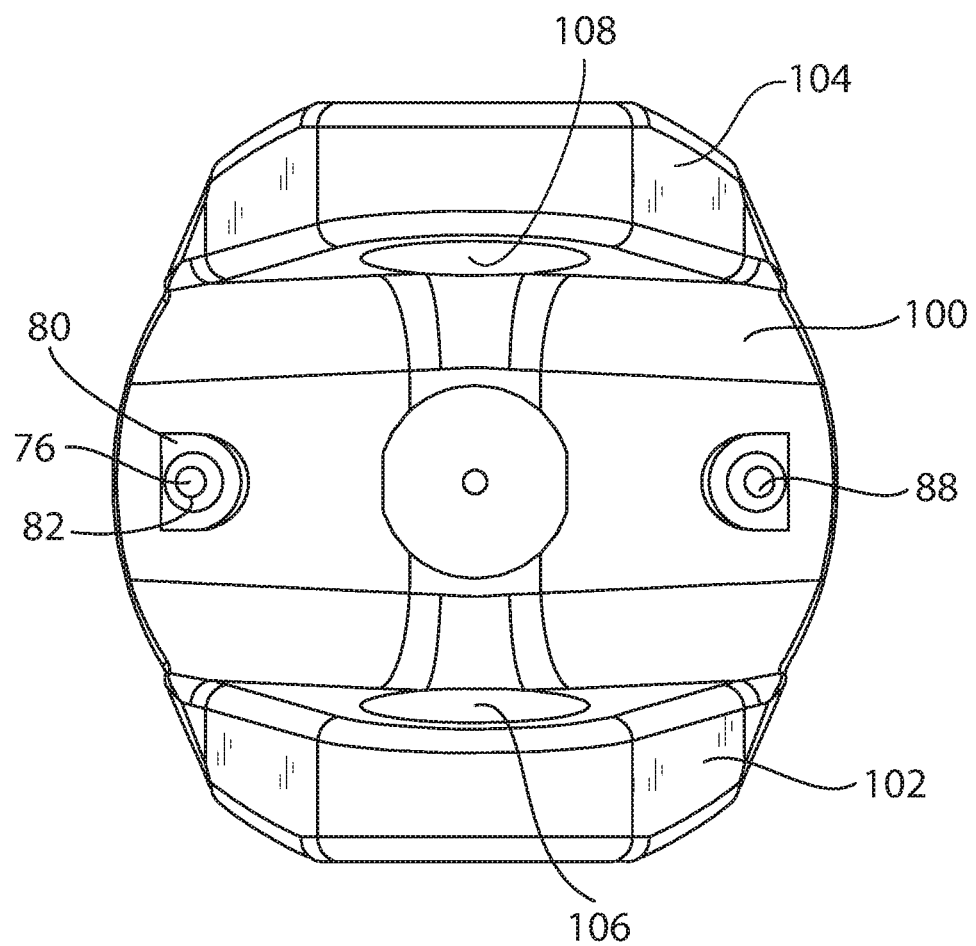
FIG. 7 is an outer end view of the yoke of FIGS. 4-6.
Figure 8:
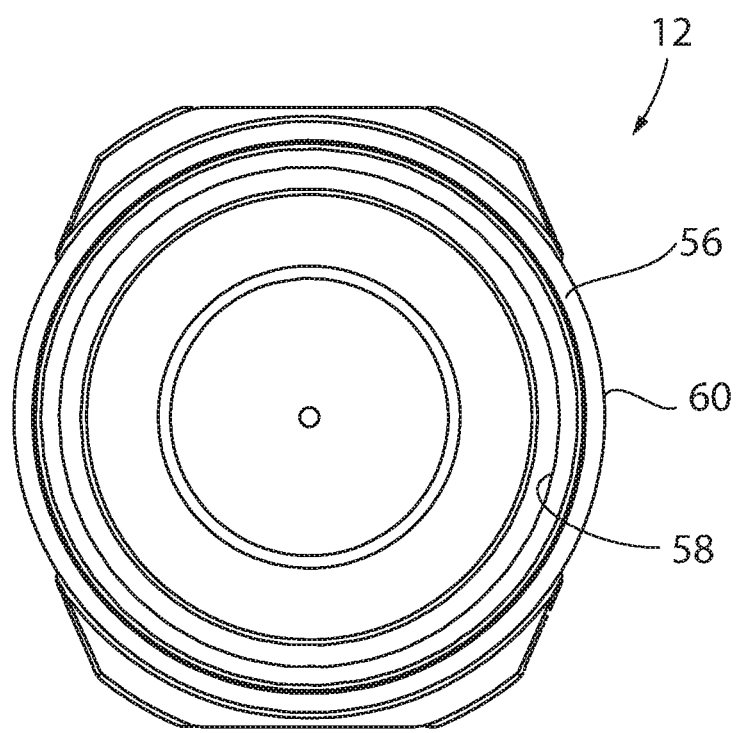
FIG. 8 is an inner end view of the yoke of FIGS. 4-7.

Still referring to FIGS. 2, 6, and 7, a second, bleed passage 84 is formed in yoke 12 at a location that is spaced peripherally from the injection passage 74. Bleed passage 84 is configured to vent or release air from cavity 70 during the adhesive injection procedure. The bleed passage 84 is most effective when spaced 180 degrees from the injection passage 74, though spacings of considerably fewer and/or additional bleed passages 84 are certainly possible. The bleed passage 84 extends linearly at an acute angle relative to the axial centerline of the composite shaft assembly 10 from an inlet 86 formed in the outer peripheral surface 60 of the sleeve 56 within the cavity 70 to a port or passage that may take the form of an outlet 88 formed in an axial end surface of the crown 100 of the yoke 12. This angle may be within the same range relative to the axial as the angle of the injection passage 74 and, most typically, will be the same as the angle of the injection passage 74, i.e., between 5 degrees and 20 degrees and most typically of about 10-15 degrees. The location of the outlet 88 on the crown 100 of the yoke 12 negates the need to drill into the composite tube 40. The outlet 88 is shown as being counterbored and countersunk such that, if desired, the passage 84 could be used as the injection passage, in which case the passage 74 could function as the bleed passage. Stated another way, the ports or passages 74 and 84 function interchangeably.

Alternatively, or instead of this arrangement, two or more opposed bleed passages could be provided that are each spaced in opposite directions about 150° to 175° from the adhesive injection passage 74.

Figure 9:
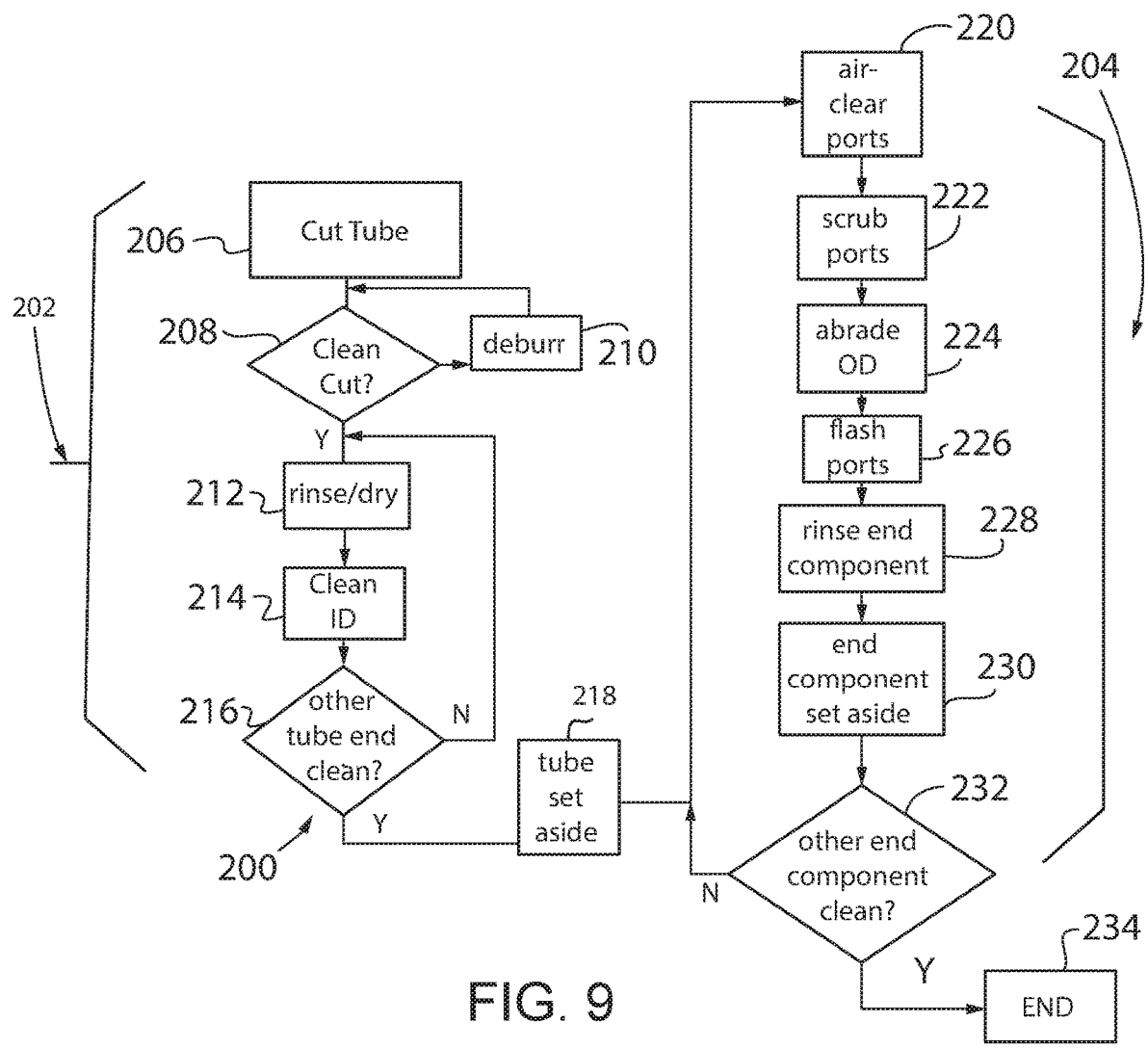
FIG. 9 is a flow diagram representing a surface preparation phase used in producing a composite vehicle driveshaft.
Figure 10:
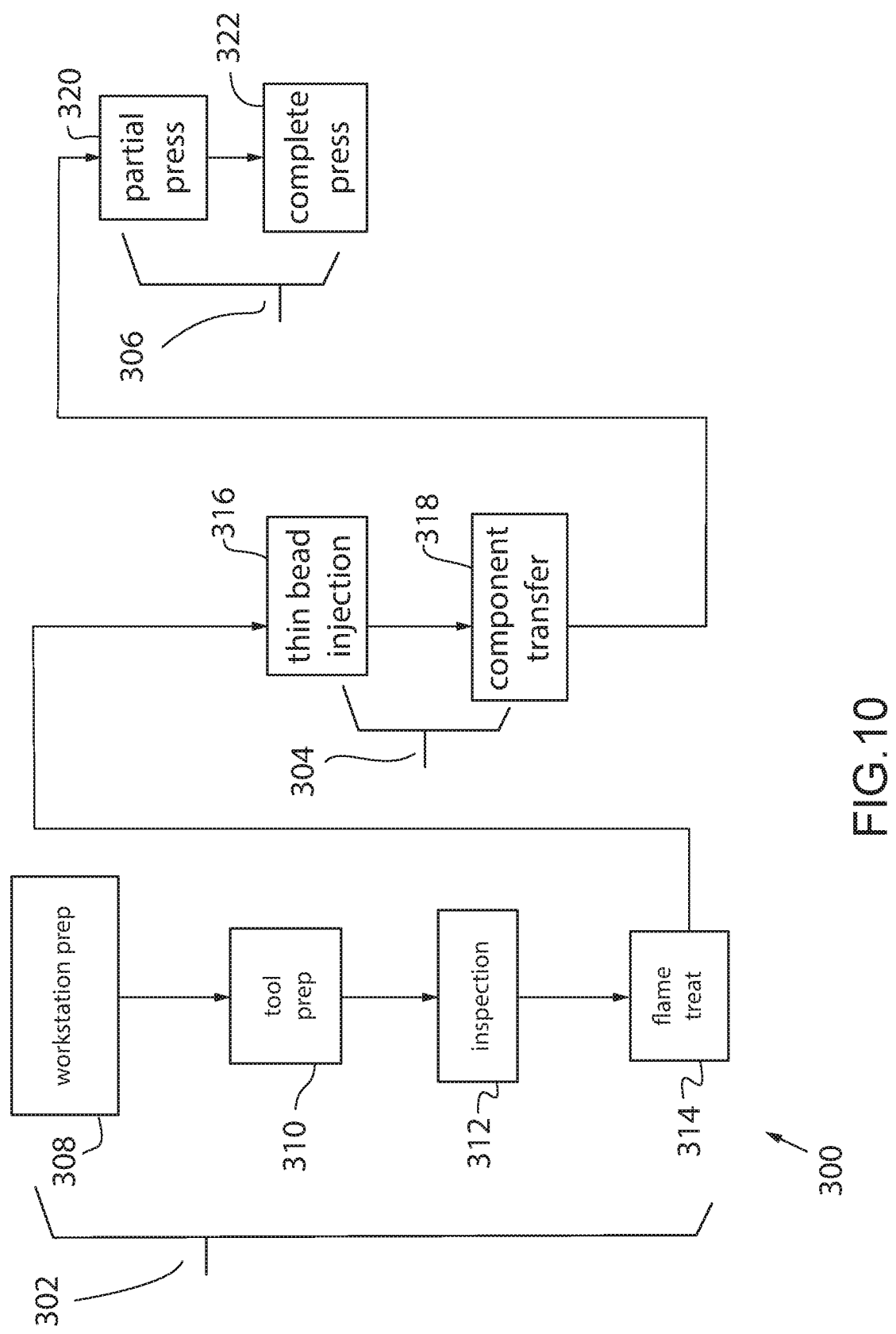
FIG. 10 is a flow diagram representing an assembly phase used in producing a composite vehicle driveshaft.
Figure 11:
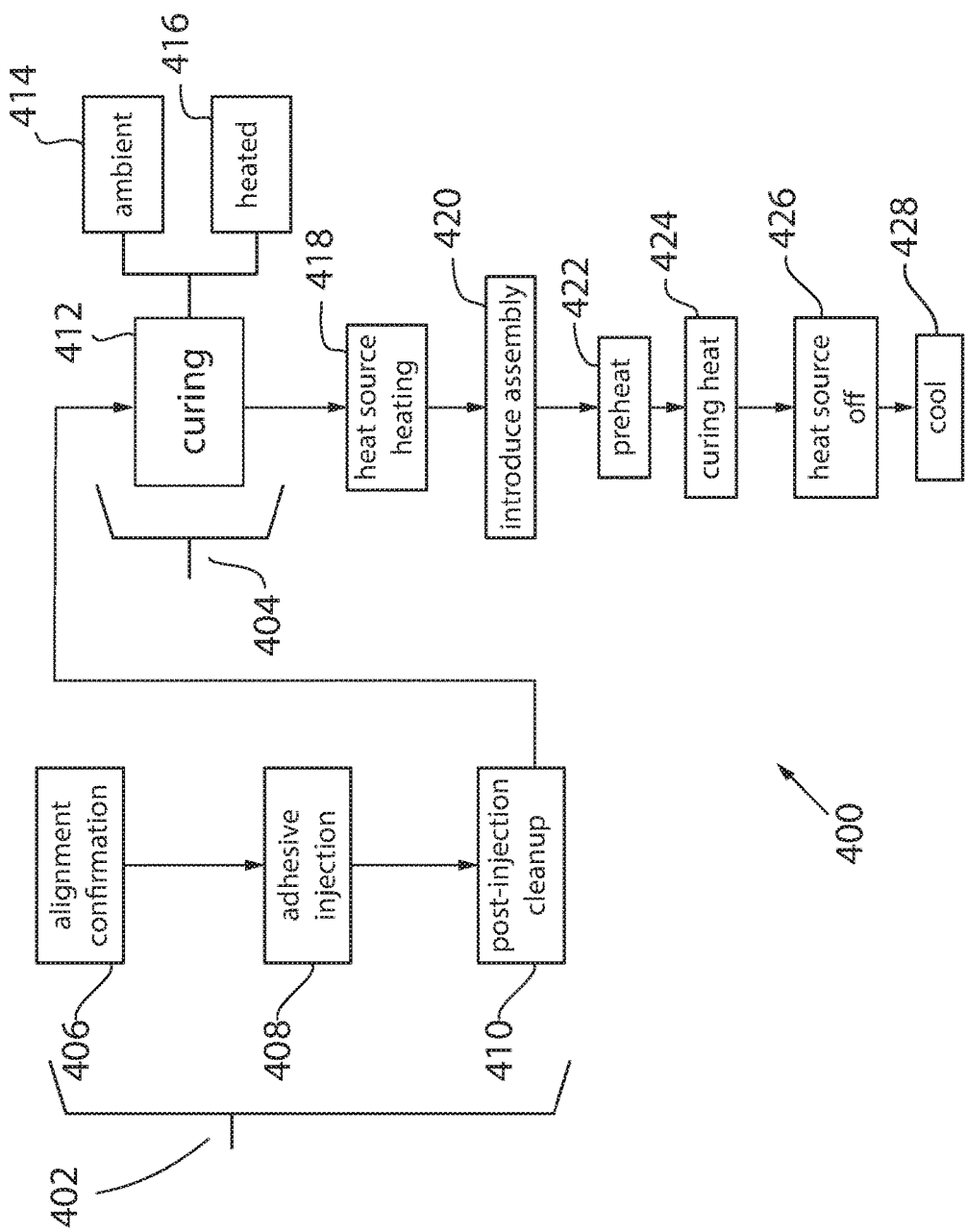
FIG. 11 is a flow diagram representing a bonding phase used in producing a composite vehicle driveshaft.

Referring now to FIGS. 9-11, regardless of the particular adhesive injection bore configuration or the particular type(s) of driveline joints implemented on the composite driveshaft assembly 10, the driveshaft assembly 10 is typically assembled by way of a build procedure with multiple phases, represented as surface preparation phase 200 in FIG. 9, assembly phase 300 in FIG. 10, and bonding phase 400 in FIG. 11. Before beginning the multi-phase build procedure, general workstation preparation is performed. This includes, for example, preparing a build area of the workstation for the multi-phase build procedure by cleaning the build area thoroughly to ensure that any work surfaces that will be used are completely free of oils and debris, whereby debris and oils cannot be seen or felt. If compressed air is using in any of the phases of the multi-phase build procedure, then a user should ensure that the compressed air system that feeds the workstation has an air dryer and filtration system and that such a system is operational to ensure that the compressed air is free of oil and water.

Referring now to FIG. 9, surface preparation phase 200 includes is represented as at least two stages, shown as tube surface preparation 202 and end component surface preparation 204. During tube surface preparation 202, composite tube 40 is cut to length based on the requirements for a particular driveshaft assembly 10 being built, with an appropriate blade, as represented at process block 206. Typically, a rotary-style or other wet saw is used to reduce dust while cutting the composite tube 40. At decision block 208, the cut end of composite tube 40 is inspected for a cleanliness of cut, which should be free of visible burrs or protruding fibers. As represented at process block 210, if present after cutting, burrs or protruding fibers are removed from the end using an appropriate tool such as a file, an abrasive cloth such as an emery cloth, or an abrasive pad such as various ones available from 3M® under Scotch-Brite™ and various other tradenames. If the cut end of composite tube 40 is free of burrs or protruding fibers, then the composite tube's 40 inner circumferential surface or ID (inside diameter) is rinsed, as represented by process block 212. Water is typically used during rinsing to remove any residual carbon dust from the cutting operation. Clean shop towels or the like are typically passed through the composite tube 40 to dry and wipe debris from inside the composite tube 40. The clean shop towel(s) is passed through the bore of the composite tube 40 until minimal debris from the composite tube 40 is found on the shop towel(s). As represented at process block 214, the composite tube's 40 ID is cleaned with a degreaser or solvent, which is typically acetone, for example, applied with a clean cloth such as a new, clean, no-lint shop towel that is wetted with acetone from a plunger can. The ID of the end of composite tube 40 is wiped with the acetone-wetted towel to thoroughly clean the full bond area or the length of the composite tube's 40 ID in which the end component 12, 14 is inserted. Wiping in this manner is repeated, typically with a fresh or new, clean, no-lint shop towel or other appropriate cloth with each of the wipe downs. The cloth is repositioned or replaced during the repeated wiping process until cloth remains clean after wiping. Typically, several (such as three or more) wiping cycles are required removal liquid or solid particle contamination from storage, shipping, and cutting dust and debris. After sufficient cleaning with the wiping cycles, the cloth should be completely free of any visible carbon dust and there should be no visible towel or other cloth lint inside the composite tube 40. As represented at decision block 216, if the other end of composite tube 40 has not yet been cleaned, then the process repeats of rinsing, drying, and cleaning at process blocks 212, 214 for that other end.

As represented at process block 218, after the bond areas in both ends 50, 52 of composite tube 40 are cleaned, the composite tube 40 is set aside during the end component surface preparation 204. Setting the composite tube 40 is side is done without touching the inside of the composite tube's ends 50, 52 or otherwise posing contamination risks to the cleaned surface(s). Typically, this is done by moving the composite tube 42 its set aside location by handling only its outer circumferential surface and covering its open ends with a lint-free cloth such as a no-lint shop towel. Still referring to FIG. 9, during the surface preparation of the bondable end component 12, 14, as represented by process block 220, the end component ports are pneumatically cleared. This is typically done with an aerosol-type canned air product, such as those used for removing dust from electronic components. Other dry and clean compressed air, such as filtered, dry, oil-free, shop air or the like, may also be used. The pneumatic clearing of ports removes, e.g., machining chips, cutting fluid, or other contamination in the injection holes or ports that may have accumulated during the manufacturing process or shipping/storage. As represented at process block 222, the ports are mechanically cleaned, for example, by scrubbing. This is typically done with a pipe cleaner that is sized to apply sufficient wiping engagement and resistance to push through the port while mechanically removing solid debris. As represented at process block 224, the end component's outer circumferential surface or OD (outside diameter) is scuffed or mechanically cleaned. This is typically done by abrading the OD of the inserted section (including the bond area and lands 68, 69) of the end component 12, 14 with a Scotch-Brite™ pad or other suitable abrasive pad. At process blocks 226 and 228, the ports are flushed and the inserted section of the end component 12, 14 is thoroughly rinsed. Both the port flushing and inserted section rinsing is typically done with a degreaser or solvent and more typically with acetone delivered from, for example, an acetone delivery bottle, which is typically a squeeze-type bottle.

As represented at process block 230, after the end component's inserted section has been cleaned, the end component 12, 14 is set aside for further processing, such as assembly. Setting aside the end component 12, 14 typically includes placing it at a clean location in the workstation, without touching the inserted section or exposing it to potential contact with any foreign material. During the set aside of the end component 12, 14, if the inserted section is touched or contacts any foreign material, then the process of clearing, scrubbing, abrading, flushing, and rinsing at process blocks 220, 222, 224, 226, 228 is repeated. At decision block 323 if the other end component 12, 14 has not yet been cleaned, then the process repeats of clearing, scrubbing, abrading, flushing, and rinsing at process blocks 220, 222, 224, 226, 228 for such other end component 12, 14. When both end components are cleaned and set aside, the surface preparation phase 200 is complete, as represented at process block 234.

Referring now to FIG. 10, assembly phase 300 is typically performed within 30 minutes and, more typically, within 15 minutes of the surface preparation phase 200 (FIG. 9). Assembly phase 300 is represented as at least three stages, shown as assembly preparation 302, preliminary lubrication 304, and pressing 306. Assembly preparation 302 includes workstation preparation, tool preparation, inspection, and flame treatment, respectively represented at process blocks 308, 310, 312, 314. During workstation preparation at block 308, acetone, shop towels, and/or other flammable materials are moved far away, for example, at least 10 feet, from the work surface and surrounding area. During tool preparation at block 310, an adhesive-delivery gun, such as a pneumatic, electric, or manual hand-held or other adhesive gun, is prepared for the adhesive injection. This typically includes loading an adhesive cartridge into the adhesive gun and removing the cap from the cartridge. As mentioned above, one suitable adhesive is available from the 3M Company under the tradename DP460. A mixing nozzle is attached to the cartridge's nozzle. A preliminary activation of the gun is performed to purge the mixing nozzle of air and unmixed adhesive. This is typically done by dispensing a sufficient amount of material from the mixing tube until is yields a uniform color and viscosity. Also during tool preparation at process block 310, a flame treatment torch is prepared. Typically, the torch is a MAPP gas torch and the preparation includes screwing a bottle of MAPP gas onto an appropriate torch head. During the inspection at process block 312, both the ID of the composite tube 40 and the OD of the bondable end component are inspected to ensure that there is no dust or other debris or contamination in or on either component. If the composite tube 40 and the bondable end component 12, 14 are free of dust, debris, and contamination, then a flame treatment is performed on each, as represented at process block 314.

Still referring to FIG. 10, during the flame treatment 314 of the bondable end component 12, 14, the MAPP gas torch is ignited and its flame is moved uniformly over the OD of the bondable end component's entire bond area to activate the surface of the bond area to optimize adhesion. The blue portion of the flame should contact the surface of the bond area and the bondable end component 12, 14 is rotated while contacting with the flame to ensure complete coverage. The flame treatment is performed without heating the bondable end component's bond area in excess of 160° F. The flame treatment stage is repeated for the second bondable end component 12, 14, the MAPP gas torch is turned off, and the bondable end components are set aside in a clean area. Table 1 shows various examples of suitable flame treatment times for the bondable end component 12, 14 as a function of its size, represented in terms of its OD in inches.

TABLE 1

| Bondable End Component Area Size (OD in inches) | Flame Treatment Time for Bondable End Component's Inserted Section OD (in seconds) |
| --- | --- |
| 2.0 | 20 ± 5 seconds |
| 2.5 | 20 ± 5 seconds |
| 3.0 | 30 ± 5 seconds |
| 3.5 | 30 ± 5 seconds |
| 4.0 | 40 ± 5 seconds |
| 4.5 | 40 ± 5 seconds |
| 5.0 | 50 ± 5 seconds |

During a flame treatment 314 of the composite tube's 40 end, the MAPP gas torch is re-ignited and its flame is moved uniformly around the ID of the composite tube's bond area to activate the surface of the bond area to optimize adhesion. Movement of the flame is performed continuously, and typically while rotating, so that the flame does not contact any single area of the composite tube for more than one second to reduce the likelihood of damaging the composite tube. The flame treatment is performed without heating the composite tube's bond area in excess of 140° F. while being heated sufficiently to be hot to the touch, typically between 110° F.-140° F., which can be measured with a precision thermometer/thermocouple. The flame treatment stage 314 is repeated for the second end of the composite tube 40. Table 2 shows various examples of suitable flame treatment times for the ends of composite tube 40 as a function of its size, represented in terms of its ID in inches.

TABLE 2

| Tube Size (ID in inches) | Flame Treatment Time for Tube ID (in seconds) |
| --- | --- |
| 2.0 | 20 ± 5 seconds |
| 2.5 | 20 ± 5 seconds |
| 3.0 | 30 ± 5 seconds |
| 3.5 | 30 ± 5 seconds |
| 4.0 | 40 ± 5 seconds |
| 4.5 | 40 ± 5 seconds |
| 5.0 | 50 ± 5 seconds |

The flame treatment stage 314 is repeated for the second end of the composite tube. The MAPP gas torch is turned off, and the process advances to the preliminary lubrication stage 304.

Still referring to FIG. 10, during the preliminary lubrication stage 304, as represented at process block 316, a thin bead of adhesive is injected around the inside edge of the end of composite tube 40, with the adhesive acting as a lubricant. Using a gloved hand, the adhesive is spread around the ID of the composite tube, in its bond area. Adhesive is spread around this way until the bond area is fully coated to provide full lubrication in the bond area and protect against scratching and dust generation. As represented at process step 318, the bondable end component 12, 14 and the composite tube 40 are transferred to a press-up tool at the workstation. This is done without touching the ID of the composite tube 40 or the OD of the flame-treated bond area of the bondable end component 12, 14. The press-up tool is an industry-standard press-up tool, for example, a driveshaft press, a vertical press, or a lathe. During the pressing stage 306, an initial partial press is performed, as represented at process block 320. This typically includes pressing the bondable end component 12, 14 a small fraction of the way into the end of composite tube 40, such as less than about ⅛ of the way into the tube or far enough for the bondable end component 12, 14 to self-support in the end of composite tube 40. The alignment of the bondable end component 12, 14 is inspected with respect to the composite tube 40 to ensure that the bondable end component is inserting straight and not knocked off center with respect to the composite tube 40. As represented at process block 322, the bondable end component 12, 14 is pressed the remainder of the way into the end of composite tube 40. This typically includes pressing the end component 12, 14 until its shoulder stop or other stop-type structure is fully seated against the end of the composite tube 40.

Referring now to FIG. 11, bonding phase 400 includes an injection stage 402 and a curing stage 404. During injection stage 402, alignment of the bondable end component 12, 14 within the composite tube 40 is confirmed, as represented at process block 406. The bondable end component 12, 14 and composite tube 40 are inspected to ensure that the tube is positioned in a manner that presents the holes of the ports at the end or face of the end component 12, 14 in vertical alignment with each other. As represented at process block 408, active injection of the adhesive is performed. The tip of the mixing nozzle of the adhesive gun is pressed tightly into the lower port of the vertically aligned ports and adhesive is injected into the lower port. Adhesive is injected into the lower port until it begins to bubble out of the upper port. At this point, the tip of the mixing nozzle is held in place without additional adhesive injection for between about 10 seconds to 30 seconds, typically a pause of 15 seconds, to allow any trapped air to escape. Injecting adhesive resumes through the lower port until all of the air is fully purged. A fully purged condition typically corresponds to an absence of any air bubbles through the upper port. As represented at process block 410, any excess adhesive is removed with a cleaner or solvent, such as an acetone-moistened shop towel. A strip of filament tape is placed over the openings of both ports to prevent adhesive leakage from the ports during the curing process or stage 404.

Next, As represented at process block 412 of FIG. 11, the adhesive is cured. Curing can be done in a relatively slower manner at room or ambient temperature, shown at process block 414. Ambient or room temperature curing is done for at least forty-eight hours to ensure a fully cured condition of the adhesive before installing the composite driveshaft assembly 10 into a vehicle. As represented at process block 414, curing can be done in a relatively quicker manner at an elevated temperature, shown at process block 416. Elevated temperature or heated curing is typically done in a large oven or with another heat source. As represented at process blocks 418 and 420, the heat source is activated to begin warming up and the driveshaft assembly 10 or assembly of the end components and the composite shaft 40 is placed in the oven or exposed otherwise exposed to heat from the heat source. This is typically done by preheating the oven or other heat source to 150° F. and then placing the assembly 10 into the oven or arranged with respect to the heat source to be heated by it. As represented at process block 422, the assembly 10 is left in the oven or receives heat from the heat source for between 20 minutes to 45 minutes, typically 30 minutes at 150° F., to raise the temperature of the assembly 10 to the curing temperature. At process block 424, the assembly 10 is heated at the curing temperature for an appropriate amount of time, typically 1 hour at a curing temperature of 150° F. As represented at process blocks 426, 428, the oven or other heat source is turned off or the assembly is removed from the oven or heat source exposure and then the assembly 10 is allowed to cool. The cooling typically takes at least 30 minutes at room or ambient temperature.

Many changes and modifications could be made to the invention without departing from the spirit thereof. The scope of these changes will become apparent from the appended claims.

What is claimed is:

1. A composite vehicle driveshaft assembly comprising:
  a composite tube, the composite tube being formed from wound filaments and a resin material and having inner and outer peripheral surfaces and inner and outer axial ends; and
  a yoke defining a longitudinal axis and including an outer coupler having a crown, a pair of arms that are transversely spaced from each other and extend axially outwardly from the crown, and an inner sleeve that extends axially inwardly away from the crown and that is concentrically received in one of the input and output ends of the tube, the sleeve having an outer peripheral surface that faces the inner peripheral surface of the tube with a cavity formed therebetween in the shape of an unsegmented right circular hollow cylinder, wherein the yoke includes:
  an adhesive injection passage being formed in the yoke, and wherein the adhesive injection passage extends at an acute angle along a straight-line path that is inclined away from the longitudinal axis of the yoke from an inlet that is formed in an outer axial surface of the crown of the yoke between a pair of arms to an outlet that is formed in the outer peripheral surface of the sleeve and that opens into the cavity.

2. The composite driveshaft assembly of claim 1, wherein the cavity is sealed at inner and outer axial ends thereof by structures extending between the outer peripheral surface of the sleeve and the inner peripheral surface of the tube.

3. The composite driveshaft assembly of claim 2, wherein the structures comprise lands formed on the outer peripheral surface of the sleeve.

4. The composite driveshaft assembly of claim 1, wherein the acute angle is between 5 degrees and 20 degrees.

5. The composite driveshaft assembly of claim 1, wherein the injection passage is circular in transverse cross section and the outlet opening is elliptical in shape.

6. The composite driveshaft assembly of claim 1, wherein the pair of arms are configured for connection to a driveline joint.

7. The composite driveshaft assembly of claim 1, wherein the filaments of the composite tube are formed from at least one of fiberglass and a carbon fiber.

8. The composite driveshaft assembly of claim 1, wherein the composite tube has an inner diameter of 65 mm to 125 mm, a thickness of 31.75 mm to 39.37 mm, and a length of 254 mm to 1780 mm.

9. A yoke configured for use with a composite driveshaft assembly, the composite driveshaft assembly including the yoke and a composite tube, the composite tube being formed from wound filaments and a resin material and having inner and outer peripheral surfaces and inner and outer axial ends, the yoke comprising:
  an outer coupler and an inner sleeve that is configured to be concentrically received in one of the input and output ends of the tube, wherein
  the outer coupler includes crown with an outer axial surface and a first arm and a second arm that are transversely spaced from each other and extend axially outwardly from the crown;
  the sleeve extends axially inwardly away from the crown and has an outer peripheral surface that is configured to face the inner peripheral surface of the tube with a cavity formed therebetween, wherein
  an adhesive injection passage is formed in the yoke, and wherein
    the adhesive injection passage extends at an acute angle from an adhesive injection inlet that is formed in the outer axial surface of the crown of the yoke between the first and second arms to an adhesive injection outlet that is formed in the outer peripheral surface of the sleeve and that opens into the cavity,
    the adhesive injection passage extends at the acute angle along a straight-line path that is inclined away from the longitudinal axis of the yoke and that extends from the injection passage inlet to the injection passage outlet;
  a bleed passage is formed in the yoke, and wherein
    the bleed passage extends at an acute angle from a bleed passage inlet that is formed in the outer peripheral surface of the sleeve and that opens from the cavity to a bleed passage outlet that is formed in the outer axial surface of the crown of the yoke between the first and second arms,
    the bleed passage extends at the acute angle along a straight-line path that is inclined away the longitudinal axis of the yoke and that extends from the bleed passage outlet to the bleed passage inlet.

10. The yoke of claim 9, wherein the cavity is sealed at inner and outer axial ends thereof by structures on the yoke configured to extend between the outer peripheral surface of the sleeve and the inner peripheral surface of the tube.

11. The yoke of claim 10, wherein the structures comprise lands formed on the outer peripheral surface of the sleeve.

12. The yoke of claim 9, wherein the acute angle is between 5 degrees and 20 degrees.

13. The yoke of claim 9, wherein the injection passage is circular in transverse cross section and the outlet opening is elliptical in shape.

14. The yoke of claim 9, wherein the first and second arms are configured for connection to a driveline joint.

15. A composite vehicle driveshaft assembly comprising:
a composite tube, the composite tube being formed from wound filaments and a resin material and having inner and outer peripheral surfaces and an a pair of axial ends that define an input end and an output end;
a yoke defining a longitudinal axis and including:
an outer coupler having a crown with an outer axial surface;
a pair of arms that are transversely spaced from each other and extend axially outwardly from the crown;
an inner sleeve that extends axially inwardly away from the crown and that is concentrically received in one of the input and output ends of the tube, the sleeve having:
an outer peripheral surface with a pair of lands that extend radially outward from the outer peripheral surface of the sleeve, wherein the pair of lands includes an inner land and an outer land with the inner land positioned further from the crown of the outer coupler than the outer land;
an injection passage having:
an injection passage inlet formed in the outer axial surface of the crown of the outer coupler between the pair of arms;
an injection passage outlet having an elliptical perimeter shape formed in the outer peripheral surface of the sleeve;
wherein the injection passage extends at an acute angle along a continuous straight-line path between the injection passage inlet and the injection passage outlet;
a bleed passage having:
a bleed passage inlet having an elliptical perimeter shape formed in the outer peripheral surface of the sleeve;
a bleed passage outlet formed in the outer axial surface of the crown of the outer coupler between the pair of arms;
wherein the bleed passage extends at an acute angle along a continuous straight-line path between the bleed passage inlet and the bleed passage outlet;
a cavity configured to receive a volume of adhesive during an adhesive injection procedure, wherein the cavity is in the form of an unsegmented right circular hollow cylinder that is bordered at:
respective inner and outer ends thereof by the inner land and the outer land of the sleeve;
an outer surface thereof by the inner peripheral surface of the composite tube; and
an inner surface thereof by the outer peripheral surface of the sleeve;
receives the volume of adhesive through the injection passage outlet at a first side of the cavity; and
releases a volume of air through the bleed passage inlet at a second side of the cavity that is opposite the first side of the cavity.

\* \* \* \* \*